US012573330B2

(12) United States Patent
Ra et al.

(10) Patent No.: US 12,573,330 B2
(45) Date of Patent: Mar. 10, 2026

(54) DISPLAY DRIVING CIRCUIT CONFIGURED TO PERFORM DRIVING IN VARIOUS MODES AND DRIVING METHOD THEREOF

(71) Applicant: Samsung Electronics Co., Ltd., Suwon-si (KR)

(72) Inventors: Joongmin Ra, Suwon-si (KR); Sunyoung Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 424 days.

(21) Appl. No.: 17/974,245

(22) Filed: Oct. 26, 2022

(65) Prior Publication Data

US 2023/0368723 A1 Nov. 16, 2023

(30) Foreign Application Priority Data

May 11, 2022 (KR) ........................ 10-2022-0058017

(51) Int. Cl.
*G09G 3/20* (2006.01)
*G09G 5/393* (2006.01)

(52) U.S. Cl.
CPC ........... *G09G 3/2096* (2013.01); *G09G 5/393* (2013.01); *G09G 2310/0243* (2013.01); *G09G 2310/0275* (2013.01); *G09G 2310/08* (2013.01); *G09G 2320/0673* (2013.01); *G09G 2354/00* (2013.01); *G09G 2360/06* (2013.01); *G09G 2360/128* (2013.01); *G09G 2360/18* (2013.01)

(58) Field of Classification Search
CPC ............................. G09G 3/2096; G09G 5/393
See application file for complete search history.

(56) References Cited

U.S. PATENT DOCUMENTS

| | | | |
|---|---|---|---|
| 7,375,723 | B2 | 5/2008 | Cheon et al. |
| 8,049,691 | B2 | 11/2011 | Pan et al. |
| 8,199,138 | B2 | 6/2012 | Koo et al. |
| 8,723,889 | B2 | 5/2014 | Wang et al. |

(Continued)

FOREIGN PATENT DOCUMENTS

| | | | |
|---|---|---|---|
| JP | 6621582 | B2 | 12/2019 |
| KR | 10-2006-0120899 | A | 11/2006 |

(Continued)

*Primary Examiner* — William Boddie
*Assistant Examiner* — Andrew B Schnirel
(74) *Attorney, Agent, or Firm* — Harness, Dickey & Pierce, P.L.C.

(57) ABSTRACT

An example embodiment provides a display driver integrated circuit, including: a memory including a plurality of pieces of driving information corresponding to a plurality of pieces of display mode information, the plurality of display mode information regarding a method of processing an image signal; a signal controller including a buffer, the signal controller configured to receive display mode information and image signals from a host, retrieve driving information corresponding to the display mode information among the plurality of pieces of driving information from the memory, the plurality of pieces of driving information including the driving information, write the driving information in the buffer, and convert the image signal into image data based on the driving information written in the buffer; and a data driver configured to generate a plurality of data signals based on the image data.

17 Claims, 8 Drawing Sheets

(56) References Cited

U.S. PATENT DOCUMENTS

| | | | |
|---|---|---|---|
| 9,053,674 B2 | 6/2015 | Chen et al. | |
| 10,559,499 B2 | 2/2020 | Nakagawa et al. | |
| 2009/0184975 A1* | 7/2009 | Yao | G09G 5/02 345/590 |
| 2009/0225095 A1 | 9/2009 | Kojima | |
| 2011/0234903 A1* | 9/2011 | Hori | G09G 5/008 348/521 |
| 2016/0104408 A1 | 4/2016 | Kim et al. | |
| 2016/0342262 A1* | 11/2016 | Qian | G06F 3/04166 |
| 2017/0116912 A1 | 4/2017 | Morimoto | |
| 2017/0178597 A1* | 6/2017 | Hasselgren | G06T 11/40 |
| 2018/0033696 A1 | 2/2018 | Nakagawa et al. | |

FOREIGN PATENT DOCUMENTS

| | | |
|---|---|---|
| KR | 10-2018-0013728 A | 2/2018 |
| KR | 101998255 B1 | 5/2019 |

* cited by examiner

DISPLAY DRIVING CIRCUIT CONFIGURED TO PERFORM DRIVING IN VARIOUS MODES AND DRIVING METHOD THEREOF

CROSS-REFERENCE TO RELATED APPLICATION

This application claims priority to and the benefit of Korean Patent Application No. 10-2022-0058017 filed in the Korean Intellectual Property Office on May 11, 2022, the contents of which are incorporated in their entirety herein by reference.

BACKGROUND

(a) Field

The disclosure relates to a display driver integrated circuit and a driving method of the display driver integrated circuit.

(b) Description of the Related Art

A display panel provides various visual information to a user through an image. Color and resolution expressed in order to provide better image quality are constantly evolving. A display driver integrated circuit (DDI) is used to implement the image on the display panel. A large-capacity memory is sometimes required in order to drive the display driver integrated circuit in various ways.

SUMMARY

Example embodiments relate to a display driver integrated circuit capable of performing driving in various modes and a method of driving the display driver integrated circuit.

An example embodiment provides a display driver integrated circuit including: a memory including a plurality of pieces of driving information corresponding to a plurality of pieces of display mode information, the plurality of display mode information regarding a method of processing an image signal; a signal controller including a buffer, the signal controller configured to receive display mode information and image signals from a host, retrieve driving information corresponding to the display mode information among the plurality of pieces of driving information from the memory, the plurality of pieces of driving information including the driving information and write the driving information in the buffer, and convert the image signal into image data based on the driving information written in the buffer; and a data driver configured to generate a plurality of data signals based on the image data.

An example embodiment provides a method that is executed by a display device, the method including: receiving display mode information and an image signal from a host; retrieving driving information corresponding to the display mode information from a memory, the memory storing a plurality of pieces of driving information corresponding to a plurality of pieces of display mode information regarding a method of processing the image signal , the plurality of pieces of driving information including the driving information, writing the driving information in a buffer; and converting the image signal into image data based on the driving information written in the buffer.

An example embodiment provides a display system including: a host configured to generate display mode information based on a user input or an external condition; a signal including a buffer, the signal controller configured receive display mode information and image signals from a host, retrieve one piece of driving information corresponding to the display mode information write it in the buffer, and convert the image signal into image data by using the driving information written in the buffer; and a memory including a plurality of pieces of driving information corresponding to a plurality of pieces of display mode information regarding a method of processing an image signal, the plurality of pieces of driving information including the driving information; a data driver configured to generate a plurality of data signals based on the image data; and a display panel configured to operate in response to the data signals received from the data driver.

DETAILED DESCRIPTION OF THE EXAMPLE EMBODIMENTS

Figure 1:
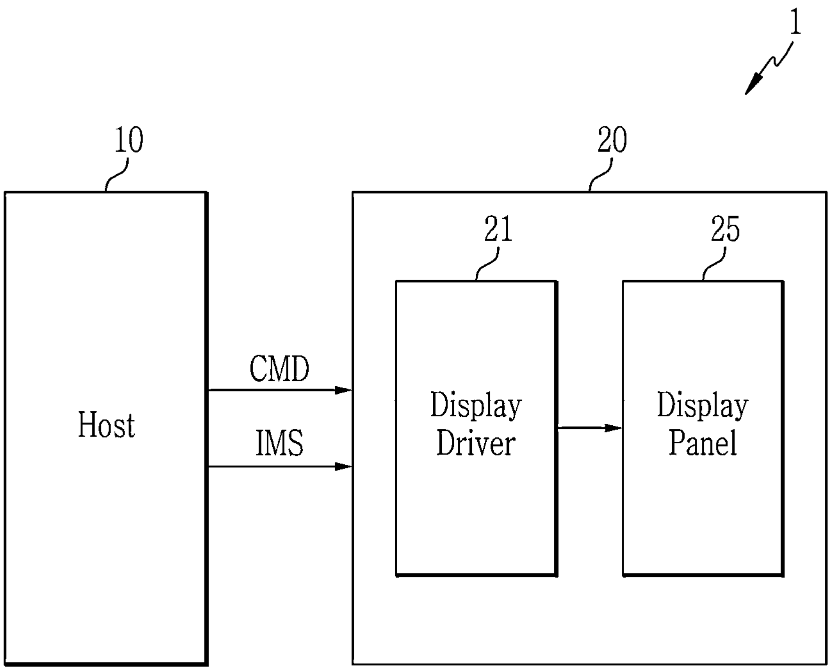
FIG. 1 illustrates a block diagram showing a display system according to some example embodiments.

In the following detailed description, only certain example embodiments have been shown and described, simply by way of illustration. As those skilled in the art would realize, the described example embodiments may be modified in various different ways, all without departing from the spirit or scope of the disclosure.

Accordingly, the drawings and description are to be regarded as illustrative in nature and not restrictive. Like reference numerals designate like elements throughout the specification. In a flowchart described with reference to the drawings, several operations may be merged, some operations may be divided, and specific operations may not be performed.

In addition, the singular forms “a” and “an” are intended to include the plural forms as well, unless the context clearly indicates otherwise. Although the terms first, second, and the like may be used herein to describe various elements, components, steps and/or operations, these terms are only used to distinguish one element, component, step or operation from another element, component, step, or operation.

FIG. 1 illustrates a block diagram showing a display system according to some example embodiments.

The display system 1 may include a host 10 and a display device 20.

The host 10 may perform overall control of operations of the display device 20. The host 10 may include an application processor or a system on chip (SOC).

The host 10 may determine an appropriate mode for driving the display device 20 based on a user input or an external condition. The display device 20 may be controlled based on one of a plurality of display modes. For example, the host 10 may determine a display mode in consideration of information related to frequency of an image signal IMS, information related to illumination entering the display device 20, information related to brightness of the display panel 25, user input, and the like. The host 10 may provide information related to the determined display mode to the display device 20. The display mode may indicate a method in which the display panel 25 displays data. For example, the display mode may be a mode in which data is outputted through the display panel 25 with high luminance when there is a lot of illumination entering the display device 20, or when a user sets the brightness of the display panel 25 to be high. A method of generating image data through processing an image signal by the display device 20 may vary based on display mode information.

The host 10 may provide the image signal IMS and a command CMD to the display device 20. The image signal IMS may be a signal of an image to be displayed on the display panel 25. The image signal IMS may include luminance information divided into grays for each pixel of the display panel 25. The image signal IMS may include red, green, and blue data corresponding to red, green, and blue sub-pixels, respectively. The image signal IMS may be generated by the host 10 or transmitted to the host 10 from the outside. The command CMD may include information related to display mode information, vertical synchronization, horizontal synchronization, and the like.

In FIG. 1, the host 10 is illustrated as a separate component from the display device 20, but the host 10 may be positioned within the display device 20.

The display device 20 may include a display driver IC (DDI) 21 and a display panel 25. The display device 20 may include an organic light emitting diode display, a liquid crystal display, or the like. In addition, the display device 20 may include a flexible display device implemented as an organic light emitting diode display, a rollable display device, a curved display device, a transparent display device, a mirror display device, etc.

The display driver IC 21 may control the display panel 25 based on the image signal IMS and the command CMD. The display driver IC 21 may receive the image signal IMS and the command CMD from the host 10.

The display panel 25 may include a plurality of pixels. Each of (or alternatively, at least one of) the pixels may include a plurality of color (red, green, and blue) sub-pixels.

Figure 2:
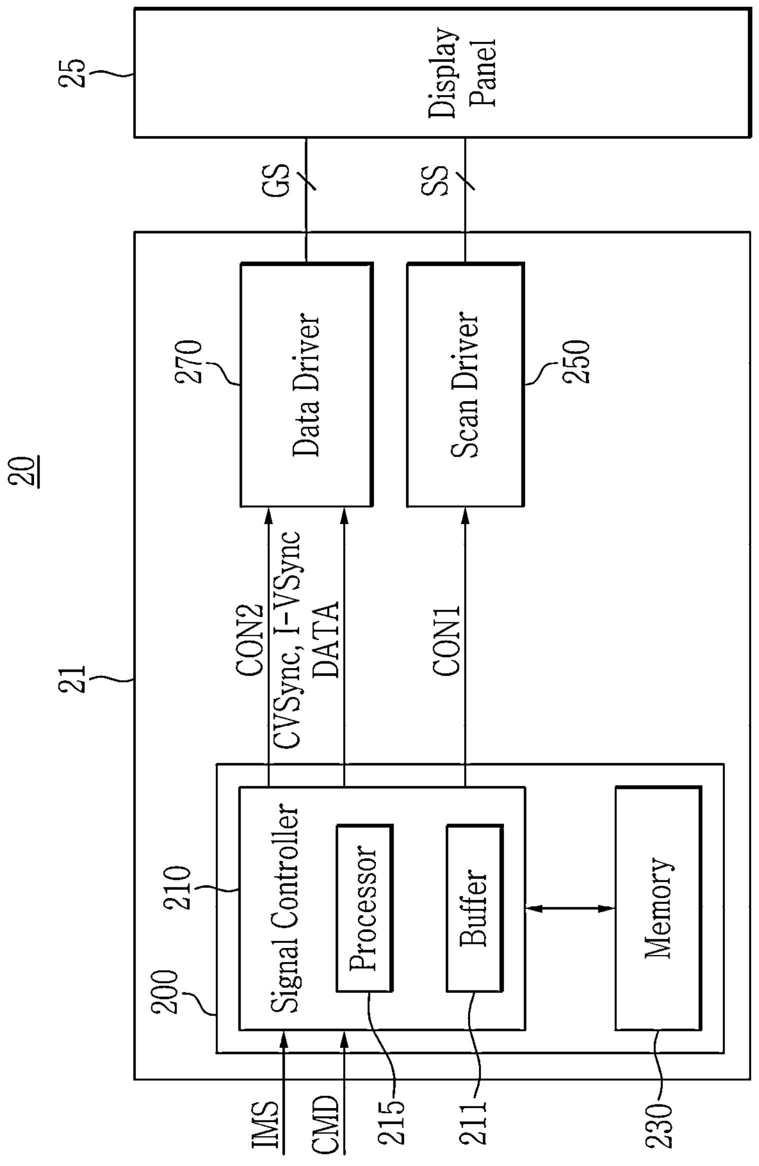
FIG. 2 illustrates a block diagram showing a configuration of a display driver integrated circuit.
Figure 3:
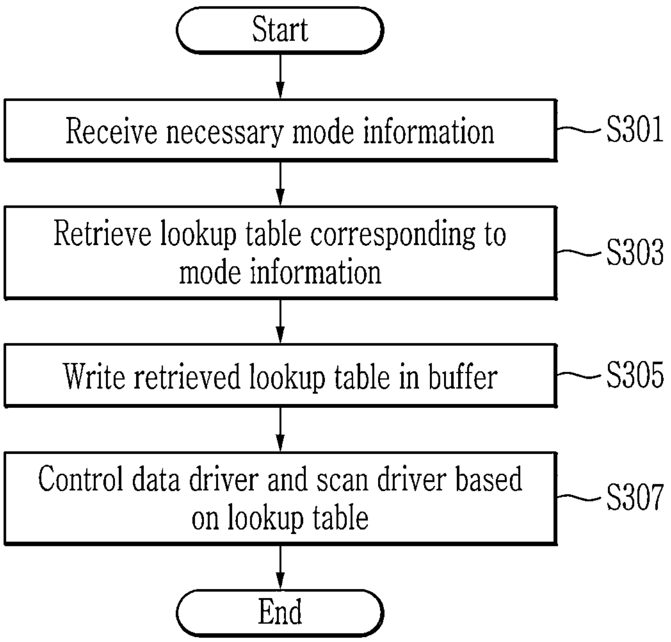
FIG. 3 illustrates a flowchart showing an operating method of a controller.

FIG. 2 illustrates a block diagram showing a configuration of a display driver integrated circuit. FIG. 3 illustrates a flowchart showing an operating method of a controller.

The display driver IC 21 may include a signal generator 200, a scan driver 250, and a data driver 270.

The scan driver 250 may provide a plurality of scan signals SS to the display panel 25 in response to a first control signal CON1.

The data driver 270 may provide a plurality of data signals GS corresponding to image data DATA to the display panel 25 in response to a second control signal CON2. For example, the data driver 270 may convert the image data DATA into a plurality of data signals corresponding to the data signals GS. Accordingly, the data driver 270 may convert image data DATA of a gray domain into a data voltage of a voltage domain.

The signal generator 200 may include a signal controller 210 and a memory 230. The signal controller 210 may include a buffer 211 and a processor 215. The processor 215 is configured to control an overall operation of the signal controller 210.

The processor 215 may receive the command CMD and the image signal IMS.

The processor 215 may generate the first control signal CON1 and a second control signal CON2 based on the received command CMD and the image signal IMS. Specifically, the processor 215 may retrieve driving information corresponding to the command CMD from the memory 230. In addition, the processor 215 may generate the first control signal CON1 and the second control signal CON2 based on the driving information. The driving information may include information related to display driving timing, such as vertical synchronization, horizontal synchronization, and a data writing period. Alternatively, information related to the driving timing may be included in the command CMD. The first control signal CON1 may include a horizontal synchronization signal.

In addition, the processor 215 may generate the image data DATA based on the command CMD and the image signal IMS received. Specifically, the processor 215 may retrieve driving information corresponding to the command CMD from the memory 230. In addition, the processor 215 may generate the image data DATA based on the driving information and the image signal IMS.

The processor 215 may perform an operation of retrieving driving information corresponding to the command CMD received from the host 10 from the memory 230 in every frame. However, some example embodiments are not limited thereto, and the processor 215 may perform an operation of retrieving driving information corresponding to the command CMD received from the host 10 from the memory 230 with a desired (or alternatively, predetermined) period.

Alternatively, only when mode information indicated by the command CMD received from the host 10 is changed, the processor 215 may perform an operation of retrieving driving information corresponding to the changed mode information from the memory 230.

For example, there may be a case in which the processor 215 receives a first command CMD from the host 10 and then receives a second command CMD following the first command CMD. In this case, when the first command CMD and the second command CMD are the same, the processor 215 may not perform an operation of retrieving driving information corresponding to the received second command CMD from the memory 230. However, when display mode information in the second command CMD is different from display mode information in the first command CMD, the processor 215 may perform the operation of retrieving the driving information corresponding to the received second command CMD from the memory 230. Thereafter, the processor 215 may generate the first control signal CON1, the second control signal CON2, and the image data DATA based on the driving information retrieved from the memory 230 and the image signal IMS.

Alternatively, the processor 215 may determine that the display mode has been changed in consideration of information related to vertical synchronization included in the command CMD received from the host 10 or a frequency at which the image signal IMS is inputted from the host 10. For example, the processor 215 may calculate a frame frequency from information related to vertical synchronization, and when the frame frequency changes, the processor 215 may determine that the display mode has been changed. Similarly, the processor 215 may calculate the frame frequency from an interval between data enable (DE) signals applied when the image signal IMS is inputted, and when the frame frequency changes, the processor 215 may determine that the display mode has been changed. When the processor determine that the display mode has been changed, the processor 215 may perform an operation of retrieving driving information corresponding to the changed mode information from the memory 230.

The processor 215 may write the driving information retrieved from the memory 230 to the buffer 211, and may use the driving information written in the buffer 211 to generate the first control signal CON1, the second control signal CON2, and the image data DATA.

In addition, the processor 215 may generate the second control signal CON2, and the processor 215 may transmit it to the data driver 270 with the image data DATA. The second control signal CON2 may include an internal vertical synchronization signal for distinguishing frames and an internal display activation signal for determining a data writing period. The internal vertical synchronization signal may be a signal delayed by a desired (or alternatively, predetermined) period with respect to a vertical synchronization signal (hereinafter, referred to as an original vertical synchronization signal) generated based on the driving information or generated based on information included in the command CMD. For example, the processor 215 may generate an original vertical synchronization signal based on information related to vertical synchronization in the driving information stored in the memory 230. The processor 215 may receive mode information from the host 10 during a front porch period before the original vertical synchronization signal. The processor 215 may generate an internal vertical synchronization signal for controlling the data driver 270 by delaying the original vertical synchronization signal for a desired (or alternatively, predetermined) delay period. In this case, the desired or predetermined delay period may be a period necessary for the processor 215 to write the driving information retrieved from the memory 230 in the buffer 211.

The internal display activation signal may be a signal delayed by a desired (or alternatively, predetermined) period with respect to a display activation signal (hereinafter, referred to as an original display activation signal) generated based on the driving information or generated based on information included in the command CMD. For example, the processor 215 may generate an original display activation signal based on information related to a data writing period in the driving information stored in the memory 230. The processor 215 may generate an internal display activation signal for controlling the data driver 270 by delaying the original display activation signal for a desired (or alternatively, predetermined) period.

The buffer 211 may receive the driving information retrieved by the processor 215 from the memory 230, and may temporarily store the driving information. The buffer 211 may be configured by using a static random access memory (SRAM) or flip-flop (FF), but some example embodiments are not limited thereto, and various memories may be used.

The memory 230 may include driving information that is required or desired based on a display mode. The memory 230 may be configured as any non-volatile memory. For example, the memory 230 may include a NAND flash memory, a vertical NAND (VNAND) flash memory, a NOR flash memory, a resistive random access memory (RRAM), a phase-change memory (PRAM), a magnetoresistive random access memory (MRAM), a ferroelectric random access memory (FRAM), a spin transfer torque random access memory (STT-RAM), etc.

The driving information based on the display mode may be stored in advance in the memory 230 in consideration of a physical characteristic of the display panel 25. The driving information may be information that preferably is updated in one frame unit, and may be in the form of a lookup table (LUT).

For example, the lookup table may include a gamma conversion table based on a gamma value indicating a gamma characteristic. The processor 215 may derive the image data DATA corresponding to the image signal IMS by using a gamma conversion table of the lookup table. A correlation between the image signal IMS and the image data DATA may follow a gamma curve specified based on the gamma value. The processor 215 may convert the image signal IMS into the image data DATA through a gamma conversion table in which the gamma curve based on the gamma value is specified.

The buffer 211 may be configured by using the SRAM, the flip-flop, or the like, and thus a time for the processor 215 to access the buffer 211 to read the driving information may be shorter than a time for the processor 215 to access the memory 230. An amount of driving information that can be stored in the buffer 211 is limited, and thus whenever display mode information is changed, the processor 215 may store and use necessary driving information in the buffer 211 from the memory 230 in which the driving information is stored.

An operating method of the signal generator 200 will be described in detail with reference to FIG. 3 together.

The signal controller 210 may receive mode information from the host 10 (S301). Alternatively, the signal controller 210 may determine the mode information based on a signal received from the host 10.

The signal controller 210 may read the memory 230 to search a lookup table corresponding to the received mode information (S303).

Thereafter, the signal controller 210 may write the searched lookup table in the buffer 211 (S305).

The signal controller 210 may control the scan driver 250 and the data driver 270 based on the lookup table stored in the buffer 211 (S307).

This method provides significant advantages in speed and efficiency at least because of the inclusion of the buffer 211. The look up table can be accessed more quickly and energy efficiently from the buffer 211 than from the memory 230. Accordingly, by copying the look up table to the buffer 210 and using the copied look up table for the other operations of the method, the time required to perform the operations by the signal controller 210 can be reduced. The overall energy consumption by the display drive integrated circuit is also reduced.

Figure 4:
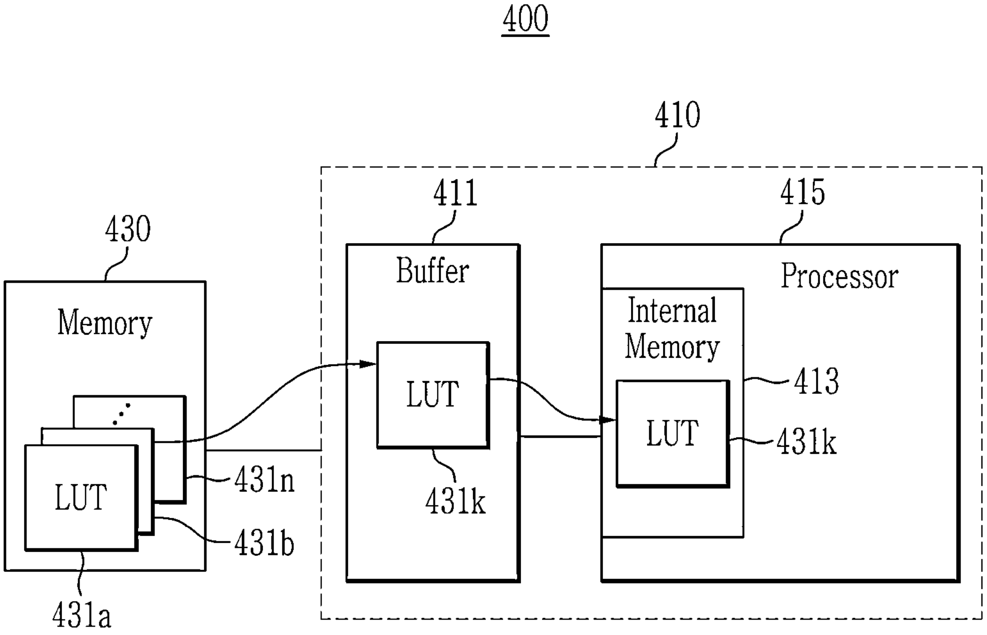
FIG. 4 illustrates a block diagram of a signal generator according to some example embodiments.

FIG. 4 illustrates a block diagram of a signal generator according to some example embodiments.

The signal generator 400 may include a signal controller 410 and a memory 430.

The signal controller 410 may include a buffer 411 and a processor 415. The processor 415 may perform an operation of converting the image signal IMS into the image data DATA. The processor 415 may process at least one piece of data among a plurality of pieces of data in the image signal IMS. For example, the processor 415 may process at least one of red (R), green (G), or blue (B) data in the image signal IMS, but example embodiments are not limited thereto.

The processor 415 may include an internal memory 413.

The internal memory 413 may be configured as a flip-flop, but example embodiments are not limited thereto. The processor 415 may convert the image signal IMS into the image data DATA based on data stored in the internal memory 413.

The memory 430 may include lookup tables 431*a*, 431*b*, . . . , and 431*n* including driving information based on a display mode.

The signal controller 410 may receive mode information in the command CMD from the host 10. For example, the signal controller 410 may receive the mode information from the host 10 during a front porch period before a time when the original vertical synchronization signal Vsync is generated.

The signal controller 410 may retrieve one lookup table 431*k* corresponding to the mode information in the memory 430. The signal controller 410 may write the retrieved lookup table 431*k* in the buffer 411. A time required (or alternatively, desired) for the signal controller 410 to retrieve the lookup table 431*k* and write the lookup table in the buffer 411 may be predetermined or calculated.

Thereafter, the signal controller 410 may load the lookup table 431*k* stored in the buffer 411 into the internal memory 413 in response to the original vertical synchronization signal Vsync.

The processor 415 may convert the image signal IMS into the image data DATA by using the lookup table 431*k* loaded in the internal memory 413.

Figure 5:
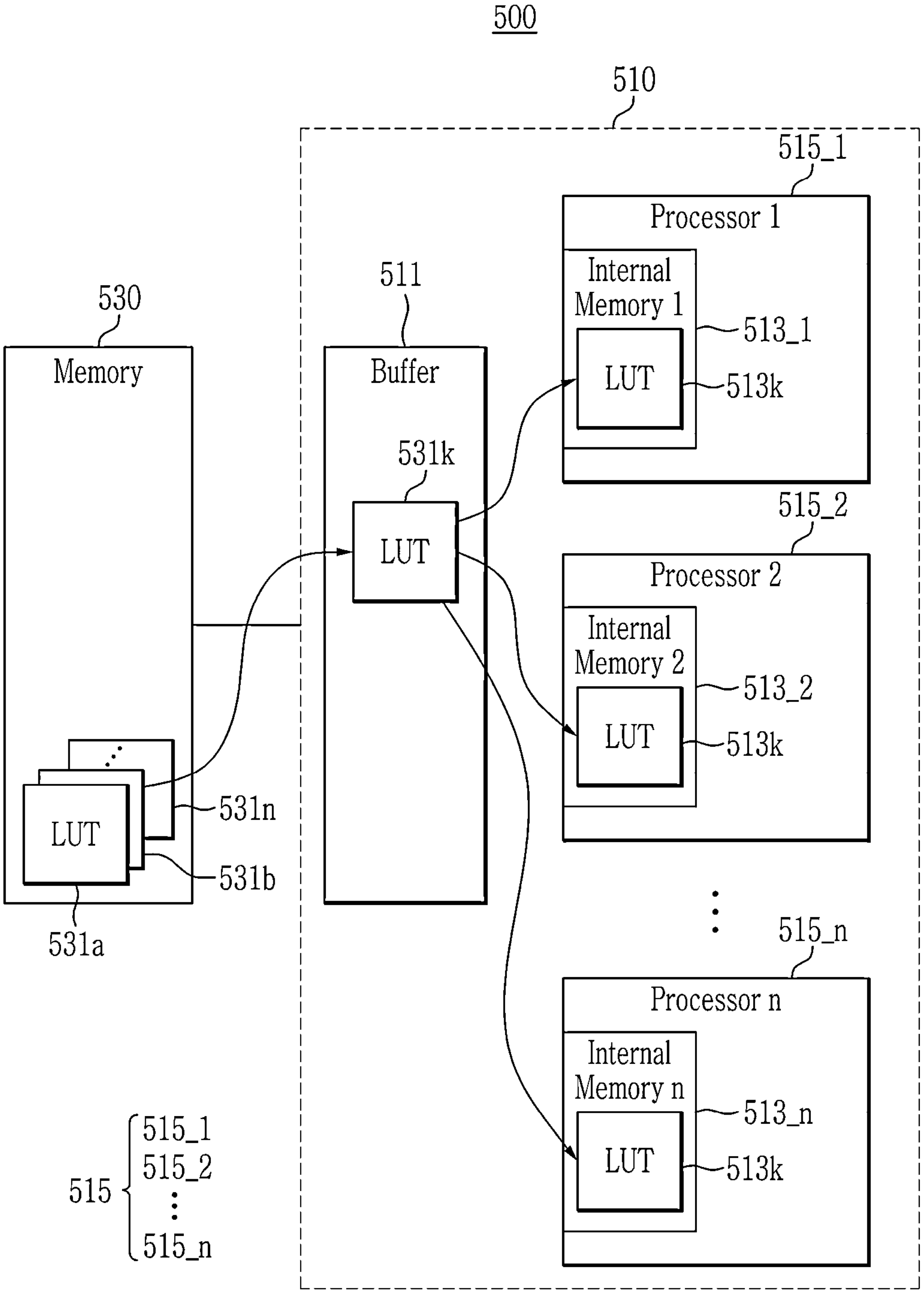
FIG. 5 illustrates a block diagram of a signal generator according to some example embodiments.

FIG. 5 illustrates a block diagram of a signal generator according to some example embodiments.

The signal generator 500 may include a signal controller 510 and a memory 530.

The signal controller 510 may include a buffer 511 and a plurality of processors 515. Each of (or alternatively, at least one of) the processors 515_1, 515_2 . . . , and 515_*n* may perform an operation of converting the image signal IMS into the image data DATA. For example, each of (or alternatively, at least one of) the processors 515_1, 515_2, . . . , and 515_*n* may process each of red (R), green (G), and blue (B) data in the image signal IMS, but example embodiments are not limited thereto. Each of (or alternatively, at least one of) the processors 515_1, 515_2, . . . , and 515_*n* may convert the image signal IMS into the image data DATA in the same manner as the processor 415 described with reference to FIG. 4 by using a corresponding lookup table.

The processors 515_1, 515_2, . . . , and 515_*n* may respectively include corresponding internal memories 513_1, 513_2, . . . , and 513_*n*.

The internal memories 513_1, 513_2, . . . , and 513_*n* may be configured as flip-flops, but example embodiments are not limited thereto. The processor 515_*m* (m being a natural number that is greater than or equal to 1) may convert the image signal IMS into the image data DATA based on data stored in the internal memory 513_*m* (m being a natural number that is greater than or equal to 1).

The memory 530 may include lookup tables 531*a*, 531*b*, . . . , and 531*n* including driving information based on a display mode.

The signal controller 510 may receive mode information in the command CMD from the host 10. For example, the signal controller 510 may receive the mode information from the host 10 during a front porch period before a time when the original vertical synchronization signal Vsync is generated.

The signal controller 510 may retrieve one lookup table 531*k* corresponding to the mode information in the memory 530. The signal controller 510 may write the retrieved lookup table 531*k* in the buffer 511. A time required (or alternatively, desired) for the signal controller 510 to retrieve the lookup table 531*k* and write the lookup table in the buffer 511 may be predetermined or calculated.

Thereafter, the signal controller 510 may copy the lookup table 531*k* stored in the buffer 511 by a number of the processors 515 in response to the original vertical synchronization signal Vsync. In FIG. 5, n processors 515_1, 515_2, . . . , and 515_*n* are illustrated, so the signal controller 510 may generate n lookup tables 531*k* by copying the lookup table 531*k*. Thereafter, the signal controller 510 may load the lookup table 531*k* into the internal memory 513_*m* of each of (or alternatively, at least one of) the processors 515_*m*.

The processor 515_*m* may convert the image signal IMS into the image data DATA based on the lookup table 531*k* loaded into the internal memory 513_*m*.

Figure 6:
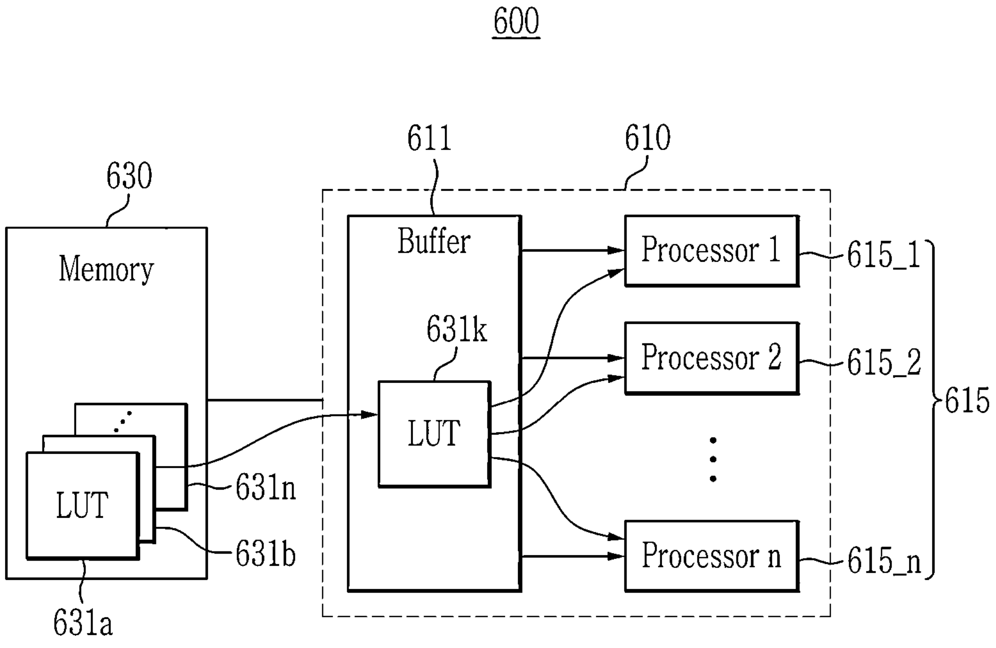
FIG. 6 illustrates a block diagram of a signal generator according to some example embodiments.

FIG. 6 illustrates a block diagram of a signal generator according to some example embodiments.

The signal generator 600 may include a signal controller 610 and a memory 630.

The signal controller 610 may include a buffer 611 and a plurality of processors 615. The processors 615 may perform an operation of converting the image signal IMS into the image data DATA. For example, each of (or alternatively, at least one of) the processors 615_1, 615_2, . . . , and 615_*n* may process each of red (R), green (G), and blue (B) data in the image signal IMS, but example embodiments are not limited thereto. Each of (or alternatively, at least one of) the processors 615_1, 615_2, . . . , and 615_*n* may convert the image signal IMS into the image data DATA in the same manner as the processor 415 described with reference to FIG. 4 by using a corresponding lookup table.

The memory 630 may include lookup tables 631*a*, 631*b*, . . . , and 631*n* including driving information based on a display mode.

The signal controller 610 may receive mode information in the command CMD from the host 10. For example, the signal controller 610 may receive the mode information from the host 10 during a front porch period before a time when the original vertical synchronization signal Vsync is generated.

The signal controller 610 may retrieve one lookup table 631*k* corresponding to the mode information in the memory 630. The signal controller 610 may write the retrieved lookup table 631*k* in the buffer 611. A time required (or alternatively, desired) for the signal controller 610 to retrieve the lookup table 631*k* and write the lookup table in the buffer 611 may be predetermined or calculated.

Thereafter, the signal controller 610 may transfer the lookup table 631*k* stored in the buffer 611 to each of (or alternatively, at least one of) the processors 615_1, 651_2, . . . , and 651_*n* in response to the original vertical synchronization signal Vsync. Each of (or alternatively, at least one of) the processors 615_1, 651_2, . . . , and 651_*n* may convert the image signal IMS into the image data DATA based on the received lookup table 631*k*.

Figure 7:
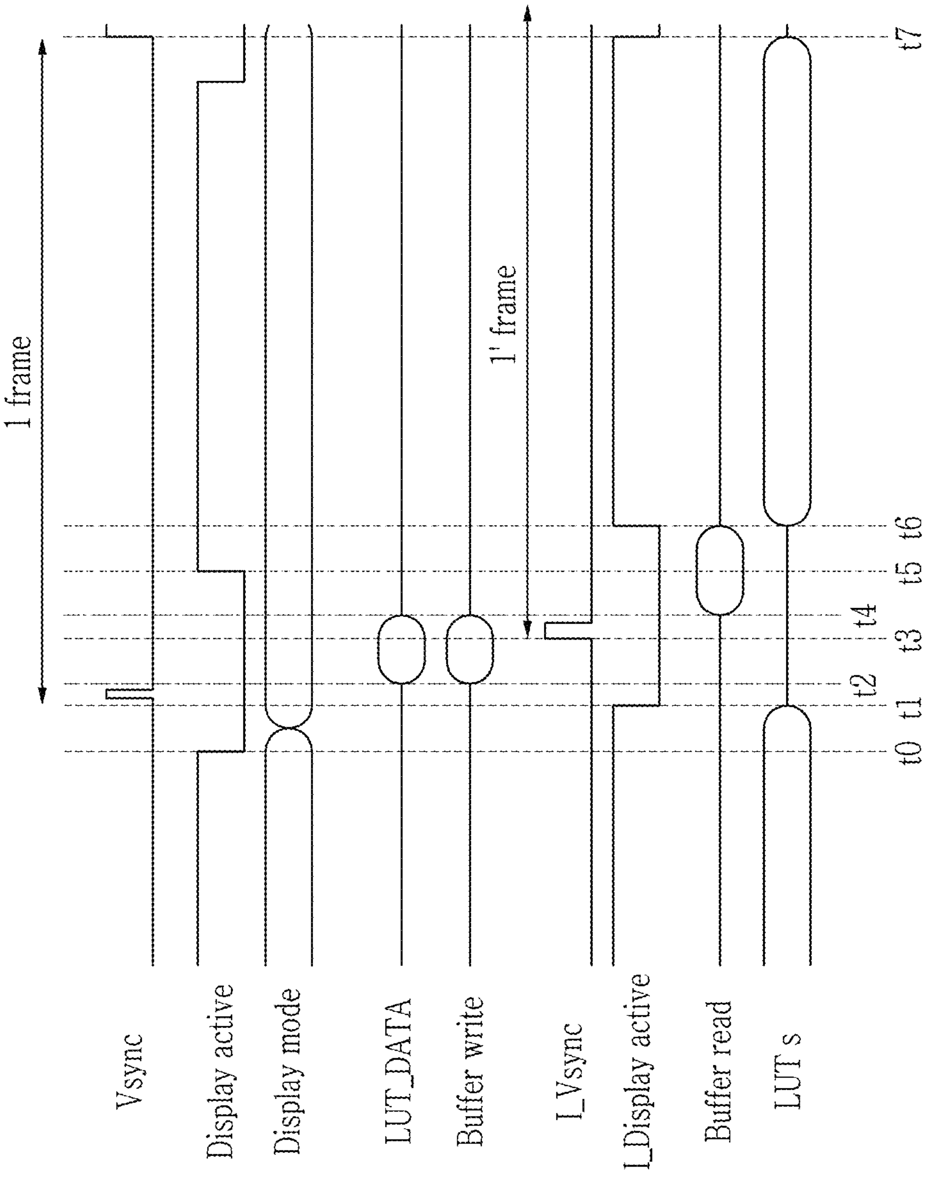
FIG. 7 illustrates a timing diagram showing an operating method of a display device according to some example embodiments.

FIG. 7 illustrates a timing diagram showing an operating method of a display device according to some example embodiments.

At t1, the processor 215 generates and outputs an external vertical synchronization signal Vsync in the form of a pulse. The processor 215 receives the mode information from the host 10 during the front porch period before the time when the external vertical synchronization signal External Vsync is generated. Herein, it has been described that the mode information may be received from the host 10, but may also be determined by the processor 215.

An external display signal Display active is deactivated at a time point t0 and activated at t5. An activation period of the external display signal Display active may be a period in which a data voltage is outputted to the display panel. A period in which data is actually outputted to the display panel 25 is not a frame period 1frame by the external vertical synchronization signal Vsync, but a frame period 1'frame by an internal vertical synchronization signal I_Vsync.

The processor 215 may retrieve any lookup table corresponding to the mode information received from the host 10 from the memory 230, and may write the lookup table in the buffer 211 during a period t2 to t4. As illustrated in FIG. 7, during a period t2 to t4, data LUT_DATA for the lookup table retrieved from the memory 230 may be transferred to the buffer 211 and written in the buffer 211. In FIG. 7, a period in which the retrieved lookup table is written in the buffer 211 is illustrated as a buffer writing signal Buffer write.

A period t2 to t4 required (or alternatively, desired) for the processor 215 to the retrieve lookup table and write lookup table in the buffer 211 may be predetermined or calculated.

At t3, the processor 215 generates and outputs the internal vertical synchronization signal I_Vsync in the form of a pulse.

At t4, the processor 215 reads the lookup table stored in the buffer 211 in response to the internal vertical synchronization signal I_Vsync. In FIG. 7, a period t4 to t6 during which the buffer 211 reads the lookup table is illustrated as a buffer reading signal Buffer read. During the period t4 to t6, the processor 215 may read the lookup table stored in the buffer 211, may copy the lookup table as many as the number of processors in the signal generator 200, and may transmit one lookup table to each processor. At the same time, at the time point t3, a frame period 1'frame by the internal vertical synchronization signal I_Vsync starts.

At t6, an internal display signal I_Display active is activated. Starting from t6, each of (or alternatively, at least one of) the processors in the signal generator 200 may convert the image signal IMS into the image data DATA based on the lookup table received from the buffer 211. During a period in which the internal display signal I_Display active is activated, the data driver 270 may output a plurality of data voltages corresponding to one frame to a plurality of data lines.

At t7, the external vertical synchronization signal Vsync may be activated again, and the signal generator 200 may repeat the above-described operation.

Figure 8:
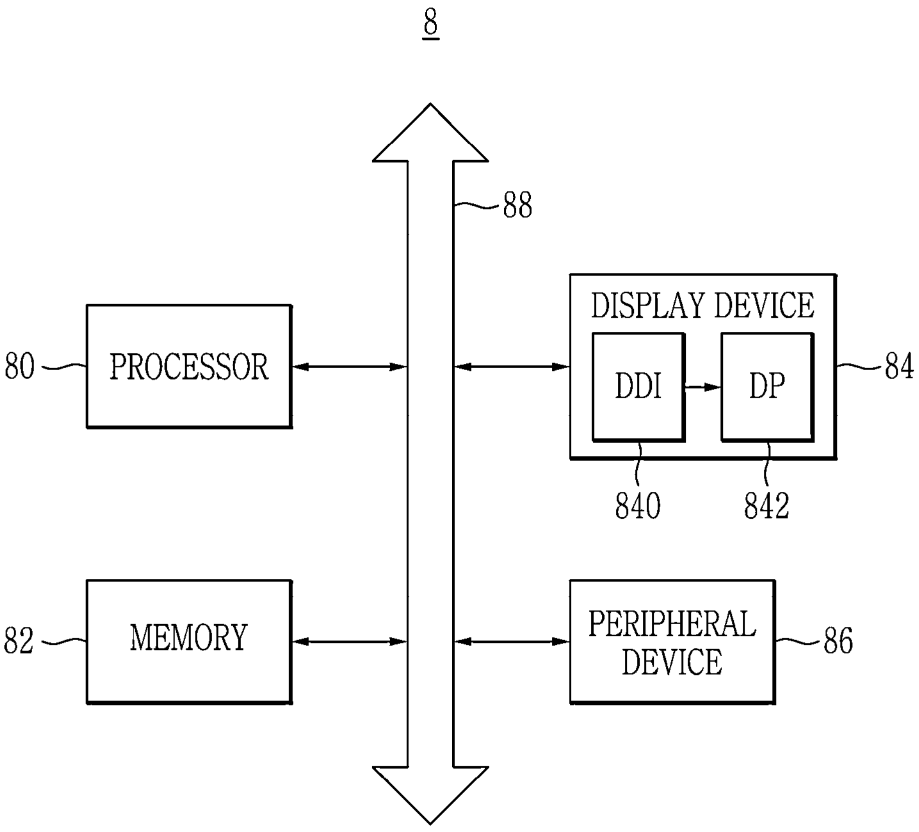
FIG. 8 illustrates a view for describing a semiconductor system according to some example embodiments.

FIG. 8 illustrates a view for describing a semiconductor system according to some example embodiments.

Referring to FIG. 8, the semiconductor system 8 according to some example embodiments may include a processor 80, a memory 82, a display device 84, and a peripheral device 86 electrically connected to a system bus 88.

The processor 80 may control input and output of data of the memory 82, the display device 84, and the peripheral device 86, and may perform image processing of image data transmitted between the corresponding devices.

The display device 84 may include a display driving circuit DDI 840 and a display panel DP 842, and may store image data applied through the system bus 88 in a frame memory included in a display driving circuit DDI 840 and display the image data on a display panel DP 842. The display driving circuit 840 may be a display driving circuit according to some example embodiments.

The peripheral device 86 may be a device that converts a motion picture or still image, such as for a camera, scanner, or webcam, into an electrical signal. The image data acquired through the peripheral device 86 may be stored in the memory 82 or may be displayed on the display panel DP 842 in real time.

The memory 82 may include a volatile memory such as a dynamic random access memory (DRAM) and/or a non-volatile memory such as a flash memory. The memory 82 may include a DRAM, a phase-change random access memory (PRAM), a magnetic random access memory (MRAM), a resistive random access memory (ReRAM), a ferroelectric random access memory (FRAM), a NOR flash memory, a NAND flash memory, and a fusion flash memory (e.g., a memory in which a static random access memory (SRAM) buffer, a NAND flash memory, and a NOR interface logic are combined). The memory 82 may store image data acquired from the peripheral device 86 or a video signal processed by the processor 80.

The semiconductor system 8 may be provided in a mobile electronic product such as a smart phone, but the example embodiments are not limited thereto, and may be provided in various types of electronic products that display images.

Any of the elements and/or functional blocks disclosed above may include or be implemented in processing circuitry such as hardware including logic circuits; a hardware/software combination such as a processor executing software; or a combination thereof. For example, the signal controller 210 and the various processors may be implemented as processing circuitry. The processing circuitry specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

Processor(s), controller(s), and/or processing circuitry may be configured to perform actions or steps by being specifically programmed to perform those action or steps (such as with an FPGA or ASIC) or may be configured to perform actions or steps by executing instructions received from a memory, or a combination thereof.

It is to be understood that the disclosure is not limited to the disclosed example embodiments, but, on the contrary, is intended to cover various modifications and equivalent arrangements included within the spirit and scope of the appended claims.

What is claimed is:

1. A display driver integrated circuit comprising:

a memory including a plurality of pieces of driving information corresponding to a plurality of display mode information, wherein the plurality of display mode information regarding a method of processing an image signal, and the plurality of pieces of driving information include information related to display driving timing to drive a display panel;

a signal controller including a buffer, the signal controller configured to receive display mode information and image signals from a host, and in response to the received display mode information being changed, retrieve driving information corresponding to the changed display mode information from the memory, write the retrieved driving information in the buffer, wherein the retrieving and the writing of the driving information are performed during a front porch interval of a vertical blanking period before a vertical synchronization signal for a current frame is generated, and convert the image signal into image data based on the driving information written in the buffer; and a data driver configured to generate a plurality of data signals based on the image data.

2. The display driver integrated circuit of claim 1, wherein the signal controller is configured to generate the vertical synchronization signal and an internal vertical synchronization signal based on the driving information that is written in the buffer, the internal vertical synchronization signal being delayed for a first period with respect to the vertical synchronization signal, and the data driver is configured to generate a plurality of data voltages based on the internal vertical synchronization signal and the image data.

3. The display driver integrated circuit of claim 2, wherein the first period is a period corresponding to a time for the signal controller to retrieve the driving information and to write the driving information to the buffer.

4. The display driver integrated circuit of claim 1, wherein the signal controller includes a processor including an internal memory, and the processor is configured to store the driving information written in the buffer in the internal memory, and convert the image signal into the image data based on the driving information stored in the internal memory.

5. The display driver integrated circuit of claim 1, wherein the signal controller includes a plurality of processors each including an internal memory, the signal controller is configured to copy the driving information written in the buffer by one or more of the plurality of processors and configured to store the driving information in the respective internal memories of the one or more of the plurality of processors, and each of the one or more of the plurality of processors is configured to convert the image signal into the image data based on the driving information stored in the internal memory.

6. The display driver integrated circuit of claim 1, wherein the signal controller includes a processor, and the processor is configured to convert the image signal into the image data based on the driving information written in the buffer.

7. The display driver integrated circuit of claim 1, wherein the plurality of pieces of driving information are stored in a form of a lookup table, and the buffer is configured as a static random access memory (SRAM).

8. The display driver integrated circuit of claim 7, wherein the lookup table includes data on a gamma characteristic indicating a correlation between the image signal and the image data.

9. The display driver integrated circuit of claim 1, wherein the buffer is a memory circuit having a shorter access time than an access time of the memory.

10. A method that is executed by a display device, the method comprising:

receiving display mode information and an image signal from a host;

in response to the display mode information received from the host being changed, retrieving driving information corresponding to the changed display mode information from a memory, the memory storing a plurality of pieces of driving information corresponding to a plurality of display mode information regarding a method of processing the image signal, wherein the plurality of pieces of driving information include information related to display driving timing to drive a display panel included in the display device, and writing the retrieved driving information in a buffer, wherein the changing of the display mode information is performed during a front porch interval of a vertical blanking period before generating a vertical synchronization signal for a current frame; and converting the image signal into image data based on the driving information written in the buffer.

11. The method of claim 10, further comprising:

generating the vertical synchronization signal based on the driving information written in the buffer;

generating an internal vertical synchronization signal delayed for a first period with respect to the vertical synchronization signal; and generating a plurality of data voltages based on the image data and the internal vertical synchronization signal.

12. The method of claim 11, wherein the first period is a period corresponding to a time to retrieve the driving information and to write the driving information to the buffer.

13. The method of claim 10, further comprising:

storing, by the display device, the driving information written in the buffer in an internal memory of a processor; and converting, by the processor, the image signal into the image data based on the driving information stored in the internal memory.

14. The method of claim 10, further comprising:

storing, by the display device, the driving information written in the buffer in a plurality of internal memories of a plurality of processors; and converting, by the plurality of processors, the image signal into a plurality of image data based on the driving information stored in the plurality of internal memories.

15. The method of claim 10, further comprising converting, by the display device, the image signal into the image data based on the driving information written in the buffer.

16. A display system comprising:

a host configured to generate display mode information based on a user input or an external condition and to generate an image signal;

a signal controller including a buffer, the signal controller configured to receive the display mode information and the image signal from the host, and in response to the display mode information being changed, retrieve one piece of driving information corresponding to the changed display mode information, write the retrieved one piece of driving information in the buffer, wherein the retrieving and the writing of the one piece of driving information are performed during a front porch interval of a vertical blanking period before a vertical synchronization signal for a current frame is generated, and convert the image signal into image data by using the one piece of driving information written in the buffer;

a memory including a plurality of pieces of driving information corresponding to a plurality of display mode information regarding a method of processing the image signal, wherein the plurality of pieces of driving information include information related to display driving timing to drive a display panel, and the plurality of pieces of driving information include the one piece of driving information;

a data driver configured to generate a plurality of data signals based on the image data; and the display panel configured to operate in response to the plurality of data signals received from the data driver.

17. The display system of claim 16, wherein the display panel is configured to be controlled by the plurality of data signals, and the display panel includes a plurality of subpixels, the signal controller includes a plurality of processors corresponding to the plurality of subpixels, each of the plurality of processors includes an internal memory, the signal controller is configured to copy the one piece of driving information written in the buffer by one or more of the plurality of processors and store the one piece of driving information copied from the buffer in the respective internal memories, and each of the one or more of the plurality of processors is configured to convert the image signal into the image data based on the one piece of driving information stored in the internal memory.

* * * * *